(12) United States Patent
Nystrom et al.

(10) Patent No.: US 9,268,976 B2
(45) Date of Patent: Feb. 23, 2016

(54) METHOD AND DEVICE FOR OPERATING A MULTIFUNCTIONAL NEAR-FIELD COMMUNICATION DEVICE SUPPORTING SEVERAL DATA FORMATS

(75) Inventors: Sebastian Nystrom, Espoo (FI); Mikko Saarisalo, Kantvik (FI)

(73) Assignee: Nokia Technologies Oy, Espoo (FI)

( * ) Notice: Subject to any disclaimer, the term of this patent is extended or adjusted under 35 U.S.C. 154(b) by 2444 days.

(21) Appl. No.: 11/996,915

(22) PCT Filed: Jul. 25, 2005

(86) PCT No.: PCT/IB2005/002160
§ 371 (c)(1),
(2), (4) Date: Jan. 25, 2008

(87) PCT Pub. No.: WO2007/012909
PCT Pub. Date: Feb. 1, 2007

(65) Prior Publication Data
US 2008/0224825 A1      Sep. 18, 2008

(51) Int. Cl.
*H04Q 5/22*         (2006.01)
*G06K 7/00*         (2006.01)
(Continued)

(52) U.S. Cl.
CPC ............ *G06K 7/0008* (2013.01); *G06F 1/3206* (2013.01); *G06F 1/3278* (2013.01);
(Continued)

(58) Field of Classification Search
USPC ..................................... 340/10.1, 10.51, 10.2
See application file for complete search history.

(56) References Cited

U.S. PATENT DOCUMENTS 5,640,151 A * 6/1997 Reis ..................... G01S 13/74
                                                340/10.2
5,777,561 A * 7/1998 Chieu ................. G06K 7/10039
                                                340/10.32
(Continued)

FOREIGN PATENT DOCUMENTS

EP        0693695 A1    1/1996
JP     2000-507756 T    6/2000
(Continued)

OTHER PUBLICATIONS

Office Action for Japanese Application No. 2008-522074 dated Nov. 30, 2010.
(Continued)

*Primary Examiner* — Jennifer Mehmood
*Assistant Examiner* — Rufus Point
(74) *Attorney, Agent, or Firm* — Alston & Bird LLP (57) ABSTRACT

The present invention relates in the field of power saving battery-operated radio frequency identification (RFID) and near field communication (NFC) devices and provides a method to operate a multifunctional NFC/RFID device that supports two or more data formats according to respective protocols of respective standards. The method of the invention comprises obtaining context information about the context of said multifunctional near-field communication device, and selecting an operation mode for the multifunctional near-field communication device for communicating with external devices on the basis of said obtained context information. In the method said selected operation mode defines proportionality values for communicating according to said two or more supported data formats according to respective protocols of respective standards. Said operation mode is used to for switching operation of said multifunctional near-field communication device between said two or more supported data formats according to respective protocols of respective standards based on the proportionality values.

37 Claims, 5 Drawing Sheets (51) Int. Cl.
*G06K 7/10* (2006.01)
*H04W 52/02* (2009.01)
*G06F 1/32* (2006.01)
*H04L 29/06* (2006.01)
*H04M 1/725* (2006.01)

(52) U.S. Cl.
CPC ........ *G06K7/10237* (2013.01); *G06K 7/10297* (2013.01); *H04L 69/18* (2013.01); *H04W 52/0229* (2013.01); *H04W 52/0241* (2013.01); *H04W 52/0258* (2013.01); *H04M 1/7253* (2013.01); *H04M 2250/04* (2013.01); *H04M 2250/10* (2013.01); *Y02B 60/126* (2013.01); *Y02B 60/50* (2013.01)

(56) References Cited

U.S. PATENT DOCUMENTS

| | | | |
|---|---|---|---|
| 6,172,609 B1 * | 1/2001 | Lu | G06K 7/0008 340/10.4 |
| 6,317,027 B1 | 11/2001 | Watkins | |
| 6,466,802 B1 | 10/2002 | Blakeney, II et al. | |
| 6,480,100 B1 * | 11/2002 | Frieden | G06K 7/0008 340/10.1 |
| 6,608,551 B1 * | 8/2003 | Anderson | G06K 7/0008 340/10.1 |
| 7,075,412 B1 * | 7/2006 | Reynolds | G06K 7/10297 340/10.2 |
| 7,283,037 B2 * | 10/2007 | Diorio | G06K 19/0723 340/10.1 |
| 7,333,479 B2 | 2/2008 | Jalkanen et al. | |
| 7,403,744 B2 * | 7/2008 | Bridgelall | H04W 4/203 340/10.1 |
| 7,432,814 B2 * | 10/2008 | Dietrich | G06K 7/0008 340/10.1 |
| 7,443,300 B2 * | 10/2008 | Tessier | G01S 5/14 340/10.1 |
| 7,501,953 B2 * | 3/2009 | Diorio | G06K 7/0008 340/10.3 |
| 7,518,519 B2 * | 4/2009 | Sullivan | G06K 7/0008 340/10.1 |
| 2001/0050922 A1 * | 12/2001 | Tiernay | G08G 1/017 370/467 |
| 2002/0084889 A1 | 7/2002 | Bolavage et al. | |
| 2004/0069852 A1 * | 4/2004 | Seppinen | G06K 7/0008 235/451 |
| 2004/0176032 A1 | 9/2004 | Kotola et al. | |
| 2004/0220860 A1 * | 11/2004 | Persky | A47F 9/047 705/23 |
| 2004/0264441 A1 | 12/2004 | Jalkanen et al. | |
| 2005/0083181 A1 | 4/2005 | Jalkanen et al. | |
| 2005/0099269 A1 | 5/2005 | Diorio et al. | |
| 2005/0099270 A1 | 5/2005 | Diorio et al. | |
| 2005/0156709 A1 | 7/2005 | Gilbert et al. | |
| 2006/0006986 A1 * | 1/2006 | Gravelle | G06K 7/0008 340/10.3 |
| 2006/0238301 A1 * | 10/2006 | Wu | G06K 7/0008 340/10.1 |
| 2006/0238302 A1 * | 10/2006 | Loving | G06K 7/0008 340/10.1 |
| 2006/0238304 A1 * | 10/2006 | Loving | G06K 7/0008 340/10.1 |
| 2006/0238305 A1 * | 10/2006 | Loving | G06K 7/0008 340/10.1 |
| 2006/0267731 A1 * | 11/2006 | Chen | G06Q 10/08 340/10.1 |
| 2006/0267733 A1 * | 11/2006 | Steinke | G06K 7/0004 340/10.1 |
| 2007/0069862 A1 * | 3/2007 | Mo | H04L 69/18 340/10.2 |
| 2008/0039132 A1 | 2/2008 | Delibie et al. | |
| 2008/0094182 A1 * | 4/2008 | Sugano | G06K 7/0008 340/10.5 |

FOREIGN PATENT DOCUMENTS

| | | | |
|---|---|---|---|
| JP | 2000-227947 A | 8/2000 | |
| JP | 2001-312699 A | 11/2001 | |
| JP | 2002-319003 A | 10/2002 | |
| JP | 2002-535860 T | 10/2002 | |
| JP | 2002-342724 A | 11/2002 | |
| JP | 2003-022423 A | 1/2003 | |
| JP | 2003-507983 T | 2/2003 | |
| JP | 2003-259457 A | 9/2003 | |
| JP | 2003-318802 A | 11/2003 | |
| JP | 2004-192253 A | 7/2004 | |
| JP | 2004-274723 A | 9/2004 | |
| JP | 2005-018166 A | 1/2005 | |
| JP | 2005-020173 A | 1/2005 | |
| JP | 2005-151257 A | 6/2005 | |
| JP | 2007-528043 T | 10/2007 | |
| WO | WO-01/05174 | 1/2001 | |
| WO | WO0150407 A1 | 7/2001 | |
| WO | WO2004089016 A1 | 10/2004 | |
| WO | WO-2005/038696 | 4/2005 | |
| WO | WO 2005/060290 A1 | 6/2005 | |

OTHER PUBLICATIONS

Non-Final Rejection dated Aug. 11, 2009 in related Korean appl. No. 10-2008-7001935.
International Search Report and Written Opinion, PCT/IB2005/002160, dated Jan. 27, 2006.
Non-Final Rejection dated Jan. 8, 2010 in related China Appl. No. 200580051162.7.
Office Action for Chinese Application No. 200580051162.7 dated Aug. 4, 2011.
Office Action for Chinese Application No. 200580051162.7 dated Jan. 18, 2012.
Office Action for Chinese Application No. 200580051162.7 dated May 25, 2012.
European Search Report for Application No. 05768658.6; dated Dec. 21, 2012.

* cited by examiner

METHOD AND DEVICE FOR OPERATING A MULTIFUNCTIONAL NEAR-FIELD COMMUNICATION DEVICE SUPPORTING SEVERAL DATA FORMATS

The present invention relates to the field of power saving in wireless battery-operated devices. More particularly the present invention relates to location/context dependent power saving solutions in wireless "multifunctional" RFID (radio frequency identification) and NFC (near field communication) devices.

The term "multifunctional" is used to refer to an RFID device that is capable of operating as an RFID reader, that is further capable of emulating an RFID tag, and that can further be used for exchanging data with another RFID "multifunctional device" similar to the data transmission between an RFID tag and an RFID reader.

Power saving is an extremely critical issue in wireless battery-operated devices. The importance of power saving is getting even more important as the mobile terminals are changing to multi-radio devices that are equipped with several different radio interfaces. Each additional radio interface consumes some energy and provides increased load to the limited resources of the terminal battery.

In order to keep the operation time of the mobile terminal on a reasonable level each new radio interface added to the terminal needs to be optimized in view of power consumption requirements.

The RFID environment is as such very fragmented and there exist several overlapping technologies and protocols, such as for example ISO14443 A and B, Philips Mifare, Sony FeliCa, ECMA-340, ISO15693, ECMA-352.

So, in order to optimize the operation of a mobile terminal device with RFID devices the device must support at least a major part of the various tags that are existing in the environment in order to provide good user experience and enable promotion of RFID tags and corresponding services.

A multifunctional NFC/RFID reader/writer device should support various existing data formats, technologies, and protocols such as e.g.

Philips Mifare tag compatible communication protocols,
Sony FeliCa tag compatible communication protocols,
NFC peer-to-peer compatible communication protocols, and
ISO 14443 compatible communication protocols.

In conventional environment this means that a multifunctional NFC/RFID reader/writer has to perform several scans to support all of the above protocols.

At present there are different NFC/RFID devices known in the art.

In WO 2005038696, there is disclosed a method, a terminal and a computer program product for adjusting power consumption of a RFID reader associated with a mobile terminal. The method determines the context of the mobile terminal associated with a RFID reader and adjusts the power consumption of the RFID reader on the basis of determined context relative to at least one previous context determination. The power consumption of the RFID reader may be reduced when no change in the context of the mobile terminal is determined. Due to the adjustment of power consumption by RFID readers power can be conserved in the mobile terminals associated with RFID readers, enabling longer operation without requiring charging or replacement of the power supply of the RFID reader.

It is desirable to enable a new mode for power saving in wireless battery-operated wireless "multifunctional" near field communication devices.

It is also desirable to integrate RFID reader/writers into mobile terminals, and to optimize the power consumption of the RFID reader/writer module to keep the mobile terminal operation time on an acceptable level.

According to a first aspect of the present invention a method for operating a multifunctional near-field communication device that supports two or more data formats according to respective protocols of respective standards is provided. The method of the present invention starts with obtaining context information about the context of the multifunctional near-field communication device, and proceeds with selecting an operation mode for the multifunctional near-field communication device for communicating with external devices on the basis of said obtained context information. The selected operation mode defines proportionality values for communicating according to said two or more supported data formats according to respective protocols of respective standards for switching operation of the multifunctional near-field communication device between said (two or more) supported data formats (according to respective protocols of respective standards) based on the proportionality values.

That is, the present invention strives to determine the types of available near field communication devices, and can estimate or determine the numbers of each type of available near field communication device and can adapt the "air time" for each type of available near field communication device accordingly. If e.g. the device supports five different data formats according to respective protocols of respective standards, and only two of these data formats are detected, the device will restrict its NFC communication only to these two determined data formats. In a second step the device may also determine how many of each of said types of available near field communication devices are available to adapt the air time for each of said types according to the proportionality values of the occurrence of said types.

The present invention can be used to implement two different objects. The first object resides in increasing the quality of communication by providing as much air time as possible for all actually available NFC devices. The second object resides in saving power by economizing any connection set up procedures to devices that are not available or expected to be not available.

If all the available NFC/RFID communication time is used for connections of only available devices the time required to read out all available information, or the time required to find/set up a certain desired NFC/RFID connection can be reduced significantly. This approach also reduces the airtime until a certain desired connection is set up or a certain NFC/RFID service is used, which in turn reduces the required transmission time and therefore reduces the required battery power of the mobile device.

In the following the expression "multifunctional" is used to refer to an NFC/RFID device that is capable of operating as an RFID reader, capable of emulating an RFID tag, and that can further be used for exchanging data with another RFID "multifunctional device" similar to the data transmission between an RFID tag and an RFID reader. The expression "multifunctional" can also mean that the device is capable of communicating with different near field communication devices using different data formats, different communication protocols and different standards. The RFID multifunctional device may also be capable of emulating RFID tags.

That is, the context obtaining may e.g. include the location information etc. which is used to select proper "operation mode" before or at the moment when the multifunctional near-field communication device is activated. The activation of the multifunctional near-field communication device can for example occur in response to a triggering including receiving a user command from a user interface or in response to an automatic activation of the NFC module upon detection of a predetermined triggering event.

It may be explicitly noted that in the present invention the use of delay periods is also included in the method. The delay periods can comprise the use of usual and dedicated delay periods.

In another example embodiment of the present invention the method further comprises obtaining updated context information and adjusting said operation mode of the multifunctional near-field communication device for communicating with external devices on the basis of said obtained updated context information.

This embodiment is related to the issue of receiving information through the NFC/RFID interface after the multifunctional near-field communication device has been active for a certain time period, to further adjust or even change the operation mode.

In yet another example embodiment of the present invention said updated context information is obtained with another process that the context information is obtained.

This embodiment relates to the special case in which the multifunctional near-field communication device uses a first procedure to obtain "initial" context information e.g. via a location service and is operated in an adaptive fashion to select an operation mode according to the data actually available. For example the multifunctional near-field communication device may select a first mode of operation on the basis of information received from a network. During operation in said first mode of operation the multifunctional near-field communication device detects, that a second mode of operation is more suitable, and changes from the first mode of operation to said second mode of operation. The first mode of operation may be selected on the basis of time or location information or on the basis of information received from e.g. a communication network. The second mode of operation may be selected on the basis of actually determined data traffic, detected numbers of NFC/RFID devices in the proximity, data received from other terminals (and/or even time or location information or information received from e.g. a communication network).

So, in other words, based on the context of the terminal, a proper operation mode is selected upon initiation of the RFID communication module, and after a certain time of operation, the operation mode may be adjusted based on the received information through the RFID interface and possibly also using the (same or another) terminal context.

According to this embodiment, e.g. a protocol disregarding devices "not-in the area" may be totally disregarded and in this embodiment the device does not detect the "not-in-area" protocol supporting tags but gets most benefit from power saving. According to another embodiment, the "not-in-area" protocol may be less frequently used so that there is some probability to detect "not-in-area" protocol supporting tags and the power saving benefit is smaller. The correct way to approach this problem is merely a design choice and there should always be some triggers that might affect/reset the adaptation of operation modes including e.g. shutting down the terminal or like. This embodiment using the "not-in-area" protocol less frequently can also detect an approaching e.g. "FeliCa Device" NFC even in with the context information "Mifare-only".

In an example embodiment of the present invention, said context information is obtained by a determination that is based on the detected frequency of devices using supported communication protocols.

That is, the device may only rely on a passive detection of frequencies possibly used by NFC/RFID devices to determine if certain types of NFC/RFID devices are within radio range. It is also possible to combine the detection of used frequencies with a previous (wake up/broadband) signal to induce e.g. RFID tags and transponders to send a reply message.

In another example embodiment of the present invention said context information is obtained during an adaptation period, during which all notified target types are logged. The method may also have a declared adaptation period during which it will log all notified target types and after which adaptation period it would only poll for the targets found during adaptation. The adaptation period can be triggered or switched on by a user. A change in location or a change in roaming situation may also trigger the adaptation period for instance. For instance, roaming outside of the home network could automatically trigger adaptation period. The duration of the (declared) adaptation period may be fixed or variable. A fixed adaptation period has the advantage that it is simpler to be implemented. A variable adaptation period duration has the advantage that the device may save energy by reducing the radio traffic during said adaptation period in case only a few radio signals are present.

In yet another example embodiment said context information is obtained on the basis of location information. In this embodiment the basis for the obtaining of the context information is the location of the device. This embodiment can especially be used in environments with different areas of distribution of NFC/RFID devices. For example a first type of RFID tags and devices will most probably be dominant in Asia while another type of RFID tags and devices will most probably be dominant in Europe. So, in other words, after powering up, the device obtains location information (this information can be acquired from cellular network, local area network or by other means) to identify the current location where the device is. This location can be just the country, or even a 1 m by 1 m square, depending on the embodiment of the present invention. Anyhow, the terminal requires a database including location information and a corresponding set of instructions for selecting a preferred operational mode to be used for scanning frequencies for various protocols. In this embodiment there is no necessity to search for devices of a standard that is only used e.g. in India when the device is actually located in Africa. Similarly, if the device has determined that there is only one kind of NFC/RFID devices at the workplace or at home, there would be no need in these environments to search for other types of NFC/RFID devices.

The method of this embodiment comprises obtaining location information, looking up in a location/context information database of context information (obtained in a previous event) and selecting said operation mode with defined proportionality values on the basis of a respective value stored in said database. The use of said location/context information database has the advantage that the restrictions of a certain area may only be determined once in a while (including high power consumption for search and in all protocols, standards and frequency ranges) while the determination of the actual location in a mobile communication device may be provided e.g. by a communication network for free. It is also envisaged to use e.g. the identification of a base station of cellular telephone network for identifying the position of the multifunctional near-field communication device.

It is also envisaged to implement the use of a dedicated GPS- (Global Positioning System) module for obtaining the location information. This embodiment is especially useful for the use in GPS enabled mobile devices such as e.g. mobile telephones or communicators.

It may be noted that in a 4-dimensional environment of space and time it is also envisaged to implement a "time location" based context information obtaining system. In such a system the device may determine a certain correlation between locations in time and different time schemes (minutes, hours, days, weekdays, weeks, month, moon phases, seasons or years) to determine strong correlations between time and context information that may serve as a basis of determining the context information. This is possible as correlations between locations in time and locations in space occur, which may be used to obtain said desired context information. This implementation has the advantage that it is very simple to be implemented.

In another example embodiment of the method of the present invention said context information is obtained on the basis of history information. This embodiment is usable to achieve a simpler access to the context information. It is envisaged to use e.g. a simple timetable to determine when the user is in a known environment with known context information. It may be sufficient to implement a 7-day database with a time resolution of e.g. 5 minutes and storage capability of 5-7 "basic environments" or sets of context information to enable a fully-fledged operability of the context information based operation of the multifunctional near-field communication device.

This embodiment can be implemented in addition to the initial location-based operation, wherein the terminal will also be sensing the environment and keeping some sort of history log/update the database so that the optimization of the used communication protocols may be further enhanced. So, as an example, if a device has been at a location before, and has detected only certain types of devices, such as RFID tags of a first standard, the operation for detecting RFID tags of a second standard is reduced to a scanning just occasionally. The terminal may even refrain from scanning (in this area) other than the RFID tags of a first standard unless otherwise instructed. It is also envisaged to use a history database with simple statistics, which could alone be very useful for a device that does not move frequently, or does not move to many different locations. If the device has been in its home network for long period of time and has detected no NFC/RFID devices of a third standard, the device can more or less run down all polling according to this third NFC/RFID standard and thus save power. If the device returns to the home environment it may shut down all polling according to this third NFC/RFID standard and thus save power due to information stored in the history database.

In just another example embodiment of the present invention said obtaining of said context information is based on context information received from a wireless communication network.

The wireless communication network may be a local area or a wide area wireless communication network (LAN or WAN). The wireless communication network may be a public wireless communication network. It is possible that the wireless communication network is a private communication network. The wireless communication network can be wireless data communication network. The wireless communication network can also be a cellular telephone network.

In another example embodiment of the present invention said receiving of context information from a wireless communication network comprises establishing a connection to a wireless communication network, and receiving said requested context information.

In addition to above mentioned embodiments the network can play an active role here: the network could contain mechanisms to broadcast a hint to devices about which target (NFC/RFID) technologies and standards are being deployed within the terminal's current position. This information can comprise e.g. country/MCC, network/MNC, location area/AC or even single cell data in case of a cellular telephone network. For instance a network could tell the phone that in this country (MCC) the following technologies are used: FeliCa, ISO14443B, whereas no Mifare are known to exist, or that the actual cell in particular only has devices that allow communication according to the FeliCa standard.

In yet another example embodiment of the present invention the method further comprises a step of sending a request for context information to said communication network. In this embodiment the multifunctional near-field communication device actively polls a desired context information (or e.g. a location information) from a communication network. Sending a dedicated request for context information to a base station of the cellular telephone network may perform this. It is also possible to provide a dedicated net server storing all availability information about all NFC/RFID data formats, protocols and standards, which are available in a certain cell. It is also envisaged to use e.g. triangulation to increase the resolution to be able to provide a "NFC/RFID data format protocol and standard map". The device may request the respective information from a server in the communication network.

In another example embodiment of the present invention the method further comprises sending obtained context information to a wireless communication network. Similar to the above example embodiments the communication network can be a public or private LAN, WLAN, WAN or WWAN. The obtained context information may be uploaded as a special service to a local or wide area network. The wide area network may use these uploaded data to update the data of the NFC/RFID map server.

It is also envisaged that the network server may request a terminal device (or multifunctional near-field communication device) to perform a service discovery routine searching for all types of available NFC/RFID devices serving as a field sensor for the NFC/RFID map server.

That is, the network can be adaptive in terms of receiving notes from the terminals regarding what target types have been read. The network can adapt its messages to the other phones based on observations made by the previous phones.

In just another example embodiment of the present invention the context information is obtained by a combination of the methods for obtaining said context information. That is, the terminal may rely on a combination of measure to get the desired context information. It is for example envisaged to use a history database in combination with location information as a basis for selecting said operation modes.

According to another aspect of the present invention a method for providing context information to a multifunctional near-field communication device connected to a wireless communication network is provided. The method comprises detecting a multifunctional near-field communication device connected to the communication network, and sending context information. In this embodiment the network (or a server in the network) automatically sends context information in case a connection to a multifunctional device is detected. This service is a kind of push service to connected terminal devices to provide context information such as the number and kind of actually available NFC/RFID devices in a special location.

In an example embodiment of the present invention the method further comprises receiving a request for context information to said communication network. In this embodiment the network only serves as a provider of information if a multifunctional near-field communication device actually requests the transmission of such context information.

It is also envisaged to send a request from the network to the multifunctional near-field communication device for context information, to ask a device to update or verify the actual context information. This updating or verifying of actual context information, may be performed by starting a device discovery procedures for each NFC/RFID data format/protocol/standard the device is compatible to.

According to another aspect of the present invention a method for operating a multifunctional near-field communication device is provided that supports two or more near-field communication data formats according to respective protocols of respective standards. The method comprises obtaining location data about the location of said multifunctional near-field communication device, and selecting an operation mode for the multifunctional near-field communication device for communicating with external near-field communication devices on the basis of said obtained location data.

In an example embodiment of the present invention said selected operation mode defines proportionality values for communicating according to said two or more supported data formats according to respective protocols of respective standards for switching operation of said multifunctional near-field communication device between said two or more supported data formats according to respective protocols of respective standards based on the proportionality values.

In another example embodiment of the present invention said method further comprises detecting the frequency used by devices with a particular one of the supported communication protocols, and adjusting said operation mode of the multifunctional near-field communication device for communicating with external devices on the basis of said detecting the frequency.

In yet another example embodiment of the present invention said location information that has been obtained and said operation modes that have been selected are logged.

According to another aspect of the present invention a method for exchanging context information between a wireless communication network and a multifunctional near-field communication device is provided. The method combines the steps of the above mentioned methods for operating a multifunctional near-field communication device in connection with the method transferring context information from a communication network to multifunctional near-field communication device of the preceding specification.

According to yet another aspect of the invention, a computer program product is provided comprising program code means stored on a computer readable medium for carrying out the method for operating a multifunctional near-field communication device that supports two or more data formats according to respective protocols of respective standards of the preceding description, when said program product is run on a multifunctional near-field communication device.

According to yet another aspect of the invention a software tool is provided comprising program code means for carrying out the method for operating a multifunctional near-field communication device that supports two or more data formats according to respective protocols of respective standards of the preceding description when said program product is run on a multifunctional near-field communication device or a network device.

According to another aspect of the present invention a computer data signal is provided. The computer data signal is embodied in a carrier wave and represents a program for performing the method for operating a multifunctional near-field communication device that supports two or more data formats according to respective protocols of respective standards as disclosed in the preceding description, when said computer program is run on a multifunctional near-field communication device or a network device.

According to just another aspect of the present invention a multifunctional near-field communication device is provided. The multifunctional near-field communication device comprises a communication module, capable of communicating according to at least two data formats according to respective protocols of respective standards. The (near field/radio frequency identification) communication module comprises an antenna, a receiver and a transmitter, each connected to said antenna, and a controller connected to and adapted for controlling said receiver and said transmitter. The controller of the communication module is connected to a context information obtaining module.

The controller is configured to select an operation mode that defines proportionality values for communicating according to said two or more supported data formats according to respective protocols of respective standards for switching operation of the multifunctional near-field communication device between said two or more supported data formats according to respective protocols of respective standards based on the proportionality values.

It may be noted that the device may provide additional receivers and transmitters in case the two or more supported data formats according to respective protocols of respective standards use different radio frequencies that may not be handled by a single receiver transmitter pair. It is also possible to use a single receiver and a single transmitter with the capability of communicating according to at least data formats of two protocols of respective standards.

The receiver/transmitter may be embodied as a single integrated transceiver, or transceiver component with common oscillators and control components.

That is, the present invention provides a multifunctional near-field communication device capable of executing the method of the present invention.

In an example embodiment said multifunctional near-field communication device further comprises a cellular telephone module connected to the near field communication controller. This embodiment is a multifunctional near-field communication enabled cellular telephone. This embodiment can use e.g. a connection to a server in the cellular telephone network to download (NFC/RFID) context information related to e.g. the location (e.g. cell) of the cellular telephone.

In another example embodiment of the present invention said multifunctional near-field communication device further comprises a storage module connected to the near field communication controller. The storage may be used to store e.g. relation tables to associate parameters with context information to be able to economize (NFC/RFID service/device) discovery procedures. It is expected that the expense (of energy and resources) required for obtaining the context information is much smaller than the expense (of energy and resources) required for performing a number of NFC/RFID service/device discovery procedures.

This embodiment can be used to determine e.g. location information as context information directly from the cellular telephone network. In this embodiment it would be sufficient to build up a lookup table relating e.g. each base station identification to a list of available NFC/RFID data formats/protocols/standard, to embody the present invention.

In yet another example embodiment of the present invention said multifunctional near-field communication device is provided with a log module connected to said storage module and said controller, for storing history information in said storage module.

This embodiment is provided to enable a set up of a history database to simplify the access to context information (and the types of available NFC/RFID devices). The log module can build up a data basis that may be used to determine strong correlations between parameters that can be obtained very simple and the types of available NFC/RFID devices to control the operation mode of the multifunctional near-field communication device (MNFCD) accordingly.

In just another example embodiment said context information obtaining module of the MNFCD is connected to a location determination module. The location determination module can be e.g. a GPS, a GLONAS, a Galileo or even a UMTS module. The module enables the device to determine the location of the device in 1 to 4 dimensions as context information to derive the availability of different types of NFC/RFID devices in the location area.

In yet another example embodiment of the invention said multifunctional near-field communication device further comprises a frequency detection module connected to said controller.

The frequency detection module can be used to recognize the NFC/RFID devices on the basis of the frequencies used. It should be clear that this embodiment may only be used for detecting/recognizing NFC/RFID devices using different frequency ranges. This embodiment is based on the fact that the operation of a receiver to detect certain frequencies is consuming less power than the operation of a transmitter and a receiver in a NFC/RFID service/device discovery procedure.

In yet another example embodiment of the present invention said multifunctional near-field communication device further comprises a wireless communication network module connected to the near field communication controller. This module may be a cellular telephone network module, WLAN module or even a Bluetooth module. All these networks may serve as a provider of at least location information that may be used as context information as a basis to select a certain operation mode of the MNFCD.

According to an additional aspect of the present invention a wireless communication network for providing context information to a connected multifunctional near-field communication device is provided. The wireless communication network comprises a wireless interface, a detection circuit, a determination circuit, a storage component and a transfer unit. The wireless interface is adapted for providing connections to multifunctional near-field communication devices. The wireless interface may be embodied as a transceiver and an antenna. The detection circuit is provided for detecting (connected) multifunctional near-field communication devices connected via said wireless interface. The determination circuit is provided for determining the location of connected multifunctional near-field communication devices. The determination circuit can be provided with signal strength evaluation components, and may also be provided with triangulation units and may be provided with signal runtime evaluation components. The storage component is capable of storing context information related to different locations. The transfer unit is provided to transfer context information related to locations of connected multifunctional near-field communication devices that have been determined to these devices.

In a simple embodiment the storage component may store associations between different locations and NFC/RFID devices available in said locations. In this simple embodiment the context information that may be transferred to MNFCDs may just be a list of available/connectable NFC/RFID devices.

At this stage the network may send context information automatically in case a multifunctional device is detected.

In a more sophisticated network embodiment the network may only send the context information in case of request received from a multifunctional near-field communication device. An even more sophisticated network may be able to send context information such as available NFC/RFID devices/services for locations requested from a multifunctional near-field communication device.

That is, the present invention provides a wireless communication network for providing context information to a connected multifunctional near-field communication device by executing a method of the present invention.

In just another example embodiment said multifunctional near-field communication device further comprises a GPS navigation module that is connected to said controller.

The implementation of a navigation system such as the global positioning system (GPS) global navigation systems (GLONAS) or a navigation system based on cells of a mobile telephone communication system or on the (planned) Galileo system may be used to determine a current position on this planet. Navigation systems provided with map databases may also be used to plan a certain route from a (e.g. current) position via some landmarks to a second position. When implemented in a device that may access a server in a communication network the present invention may be used to calculate a certain route from the first to the second position, and to download all (relevant) context information for all (relevant) route points. That is the multifunctional near-field communication device may download a map for all context information required for a trio along the calculated route. That is the device may use the context information even if a permanent contact to the communication network may not be guaranteed.

In just another additional example embodiment of the present invention said multifunctional near-field communication device is further provided with a payment module that is connected to said controller. With the payment module the device can be used to pay for certain services such as access to vending machines, tolls and the like.

In an embodiment that is combined with a navigation module, the navigation system may calculate a certain route and the interface to a communication network may provide all relevant context data for the calculated route. It may be possible to pre-store the context data for a number of route points. Especially a navigational system may have an additional advantage of providing special MIFARE or FeliCa toll payment systems for nations charging the use of motorways. This embodiment may also provide a "prepaid system for paying toll" wherein the navigation system calculates the route, the context information is downloaded form a communication network and the terminal may be provided with a payment system to be able to pay via an NFC/RFID connection.

According to another aspect of the present invention a system for providing context information to a multifunctional near-field communication device connected to a wireless communication network is provided. The system comprises at least one multifunctional near-field communication device as disclosed in the preceding specification and a wireless communication network as describes in the preceding specification.

That is, the present invention provides a system for providing context information to a multifunctional near-field communication device connected to a wireless communication network that is capable of executing a method of the present invention.

According to another aspect of the present invention a multifunctional near-field communication device is provided. The multifunctional near-field communication device comprises a near-field communication module, capable of communicating according to at least two near-field communication data formats according to respective protocols of respective standards. The near field communication module comprises an antenna, a receiver and a transmitter, each connected to said antenna, a controller connected to and adapted for controlling said receiver and said transmitter. The multifunctional near-field communication device further comprises an obtaining location data obtaining module, connected to said controller. The controller is configured to select an operation mode for the multifunctional near-field communication device for communicating with external near-field communication devices on the basis of said obtained location data.

In one example embodiment of the present invention said controller is configured to select an operation mode that defines proportionality values for communicating according to said two or more supported data formats according to respective protocols of respective standards for switching operation of the multifunctional near-field communication device between said two or more supported data formats according to respective protocols of respective standards based on the proportionality values.

In another example embodiment of the present invention said multifunctional near-field communication device further comprises a frequency detection module connected to said controller. In this embodiment said frequency detection module is configured to detect the frequency used by devices with a particular one of the supported communication protocols, and wherein said controller is configured to adjust said operation mode of the multifunctional near-field communication device for communicating with external devices on the basis of detected frequencies.

In yet another example embodiment of the present invention said multifunctional near-field communication device further comprises a cellular telephone module, connected to said controller.

In the following the invention will be described in detail by referring to the enclosed drawings.

In the following detailed description identical components have been given the same reference numerals, regardless of whether they are shown in different embodiments of the present invention. In order to clearly and concisely illustrate the present invention the drawings may not necessarily be to scale and certain features may be shown in somewhat schematic form.

Figure 1:
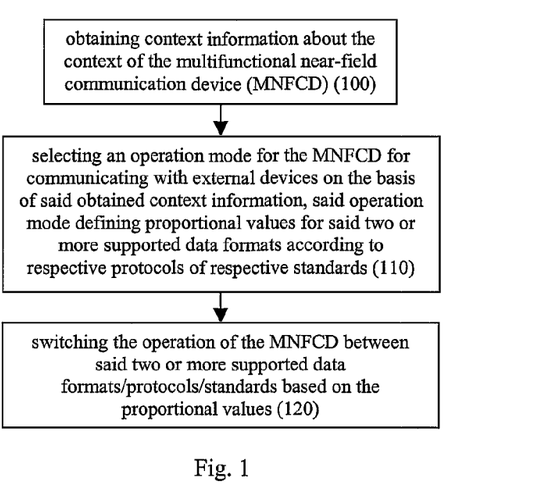
FIG. 1 is a flowchart of a method for operating a multifunctional near-field communication device that supports two or more data formats according to respective protocols of respective standards embodying an aspect of the present invention.

FIG. 1 is a flowchart of a method for operating a multifunctional near-field communication device that supports two or more data formats according to respective protocols of respective standards embodying an aspect of the present invention.

The flowchart starts with obtaining 100 of context information about the present context of the multifunctional near-field communication device, and proceeds with selecting 110 an operation mode for the multifunctional near-field communication device for communicating with external devices on the basis of said obtained context information. In the selected operation mode with defined proportionality values for communicating using said two or more supported data formats the device switches 120 the multifunctional near-field communication between said two or more supported data formats/protocols/standards based on the proportionality values.

Figure 2:
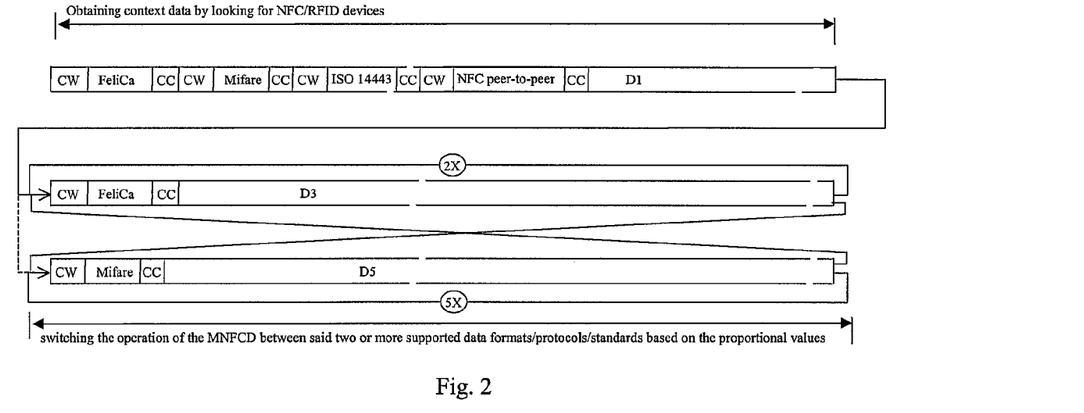
FIG. 2 is a schematic block diagram of a storage card with an increased number of contact elements according to an embodiment of the present invention.

FIG. 2 is a more detailed embodiment of the method wherein the obtaining of context information comprises a procedure for actively looking for NFC/RFID devices. In the depicted embodiment the device searches successively for FeliCa-, Mifare-, ISO 14443-, and NFC peer-to-peer communication devices. That is, the obtaining of context information comprises the searching for all kinds of available NFC/RFID/devices. Though not depicted it is expected that the multifunctional near-field communication device (MNFCD) has discovered FeliCa-, Mifare devices in a ratio of two to five. The MNFCD then starts to perform 2 contact set up operations in the FeliCa data format according to the FeliCa data exchange protocol and according to the FeliCa standard. Then the MNFCD then performs 5 contact set up operations in the Mifare data format according to the Mifare data exchange protocol and according to the Mifare standard. Then the method alternately switches between these two FeliCa and the five Mifare connection set-up protocols.

In the method the FeliCa connection set-up procedures are followed by a delay period D3 and the Mifare connection set-up procedures are followed by a delay period D3. The selection of the lengths of these delay periods decides if the method serves to save battery power (long delay periods) or serves to increase the speed of data exchange (short or no delay periods).

Figure 3A:
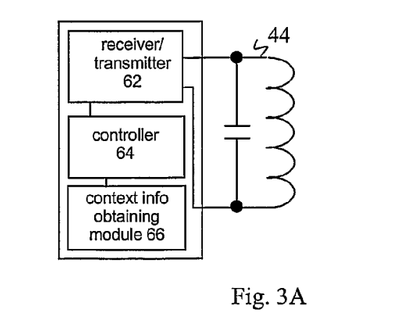
FIGS. 3A and 3B are schematic block diagrams of a multifunctional near-field communication device that supports two or more data formats according to respective protocols of respective standards according to an embodiment of the present invention.

FIG. 3A is a schematic block diagram of a multifunctional near-field communication device that supports two or more data formats according to respective protocols of respective standards according to an embodiment of the present invention. The multifunctional near-field communication device (MNFCD) comprises a communication module capable of communicating according to at least two data formats according to respective protocols of respective standards, that comprises an antenna 44, a receiver and a transmitter 62, each connected to said antenna 44, and a controller 64 that is connected to and adapted for controlling said receiver and said transmitter 62. The MNFCD is also provided with a context information obtaining module 66 that is connected to the controller 64.

The controller 64 is configured to select an operation mode that defines proportionality values for communicating according to said two or more supported data formats/protocols/standards for switching operation of the multifunctional near-field communication device between said two or more supported data formats/protocols/standards based on the proportionality values.

That is, the MNFCD is configured to obtain context information as a basis for said selection of the operation mode and said proportionality values. In the depicted embodiment it is not disclosed which kind of context information is obtained by the context information obtaining module 66. The context information should be correlated to the number and types of available NFC/RFID devices.

Figure 3B:
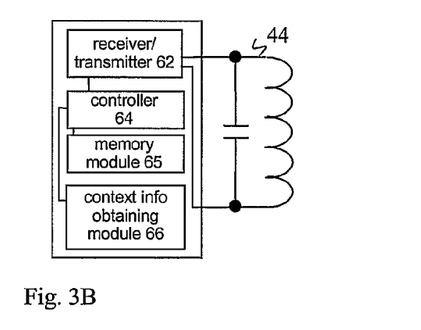

FIG. 3B is a schematic block diagram of a multifunctional near-field communication device of FIG. 3A that also comprises a memory module 65 for maintaining the instructions for the controller to communicate according to various protocols. The memory module 65 can also serve as a database to store the rules/algorithms for the selection of the protocols.

That is, the MNFCD is configured to obtain context information as a basis for said selection of the operation mode and said proportionality values and can store these obtained context information (for a single context or for a number of different contexts). In the depicted embodiment it is not disclosed which kind of context information is obtained by the context information obtaining module 66 and stored in the memory module 65. The context information should be correlated to the number and types of available NFC/RFID devices within a single area, or alternatively within a number of different areas.

Figure 4:
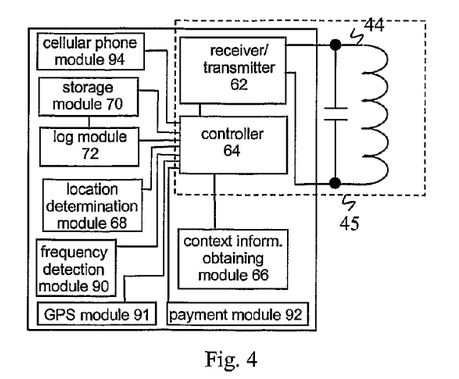
FIG. 4 is a schematic block diagram of another embodiment of a multifunctional near-field communication device that supports two or more data formats according to respective protocols of respective standards according to the present invention.

FIG. 4 is a schematic block diagram of another embodiment of a multifunctional near-field communication device that supports two or more data formats according to respective protocols of respective standards. In FIG. 4 the device of FIG. 3 is extended by a number of additional components. In FIG. 4 the communication module 45 with antenna 44, receiver/transmitter 62, and an interrupted line indicates controller 64. The controller 64 is connected to a cellular telephone module 94. The cellular telephone module 94 enables the device to obtain e.g. context information such a time and/or a location information from a cellular telephone network. The device of FIG. 4 may also be considered as a multifunctional near-field communication enabled cellular telephone.

FIG. 4 also depicts a storage module 70 an a log module 72 forming together a history database that may serve to store the number of different NFC/RFID devices in relation to number of other parameters (such a location or time).

The MNFCD is also provided with a location determination module 68 such as e.g. a GPS or an UMTS module to be able to determine its position by itself. It should be noted that the location might, according to an embodiment of the invention, only be recognized by a number of parameters that are not directly related to longitude, latitude and distance to sea level.

The MNFCD also comprises a frequency detection module 90 to recognize context information such as characteristic background noise or by characteristic frequencies used by NFC/RFID devices.

The context information obtaining module 66 may be embodied as e.g. a temperature sensor that may provide a signal indicative of an "in-house", a "carried on the body" or an "out of house" information.

FIG. 4 also depicts a GPS navigation module 91 connected to said controller. The GPS module 91 may serve as to provide navigation ability to the NFC/RFID multifunctional device.

The NFC/RFID multifunctional device of FIG. 4 may also be provided with a payment module 92 that is connected to said controller. The payment module 92 may serve as to provide a capability to use the NFC/RFID multifunctional device as an electronic purse/wallet.

Figure 5:
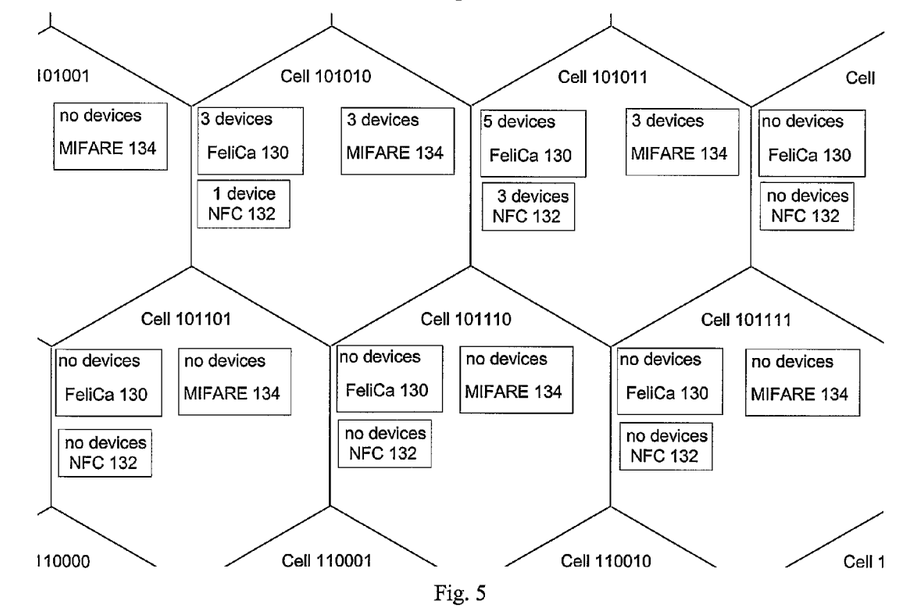
FIG. 5 is a schematic block diagram of location based distribution of NFC/RFID devices in the cells of a wireless communication network.

FIG. 5 is a schematic block diagram of location based distribution of NFC/RFID devices in the cells of a wireless communication network. FIG. 5 depicts the map stored in an MNFCD or in a wireless communication network that may serve as location/NFC/RFID device availability table. The location/NFC/RFID device availability table can serve to indicate which NFC/RFID devices may be accessed by the MNFCD in this area/or cell. The cells may be cells of a cellular telephone system or may be interpreted as other locations or combinations of parameters.

In the FIG. 5 the cell 101010 comprises three FeliCa devices 130, three Mifare devices and one NFC peer-to-peer device. Cell 101110 comprises no FeliCa 130, Mifare or NFC peer-to-peer devices. Provided with this information an MNFCD may determine on the basis of location information for which kinds of NFC/RFID devices are available and which device/service discovery procedures are promising. If the device is in cell 101010 the conventional search for all three standards can be performed, while when the device is in cell 101111 the any search/connection set-up procedures may be economized, saving power that would otherwise be wasted for a useless search for NFC/RFID devices not present.

It may be noted that the NFC/RFID device distribution map may be stored in a storage component 186 of a network or in a storage module 70 of an MNFCD.

Figure 6:
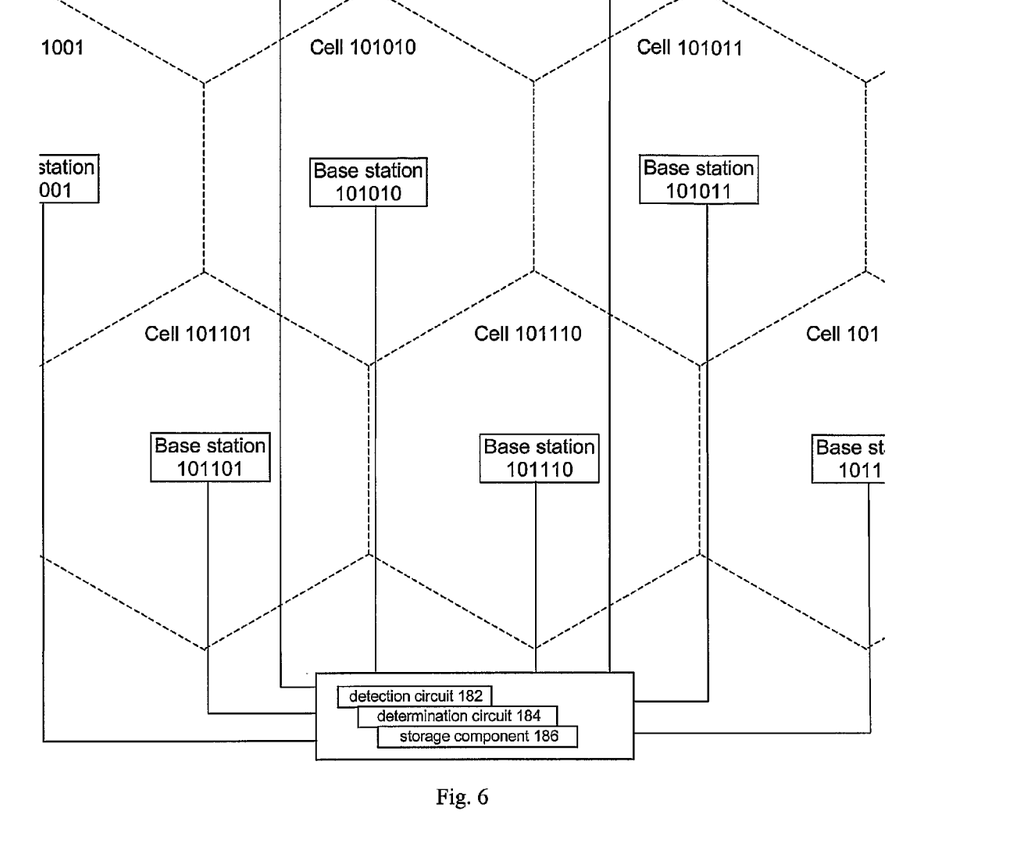
FIG. 6 is a schematic block diagram of a wireless communication network capable of providing context information to a connected multifunctional near-field communication device.

FIG. 6 is a schematic block diagram of a wireless communication network capable of providing context information to a connected multifunctional near-field communication device. The wireless communication network comprises different cells that are served by respective base stations. The base stations serve as wireless interfaces for providing connections to multifunctional near-field communication devices in the cells. The base stations are connected to a detection circuit 182 that can detect connected MNFCDs. The network is provided with a determination circuit 184 for determining the location of connected MNFCDs. The determination circuit 184 may be embodied e.g. by a home location register or a visitors location register of e.g. a GSM cellular telephone network. It is also possible to rely on information about at which cell (base station) the respective MNFCD is connected to the network.

The network is also provided with a storage component 186 for storing context information related to different locations for example in form of the NFC/RFID device distribution map depicted in FIG. 5.

The context information which kinds of NFC/RFID devices are actually available at a certain location cell is then transferred to the MNFCD in these cells by a transfer unit (e.g. by the base stations).

It should be clear that the detection/determination/storage components might also implemented as a distributed solution relying on respective components in each of the base stations. Due to the expected small number of NFC/RFID devices in each cell this may a simple way to implement the present invention in a cellular telephone network.

Figure 7:
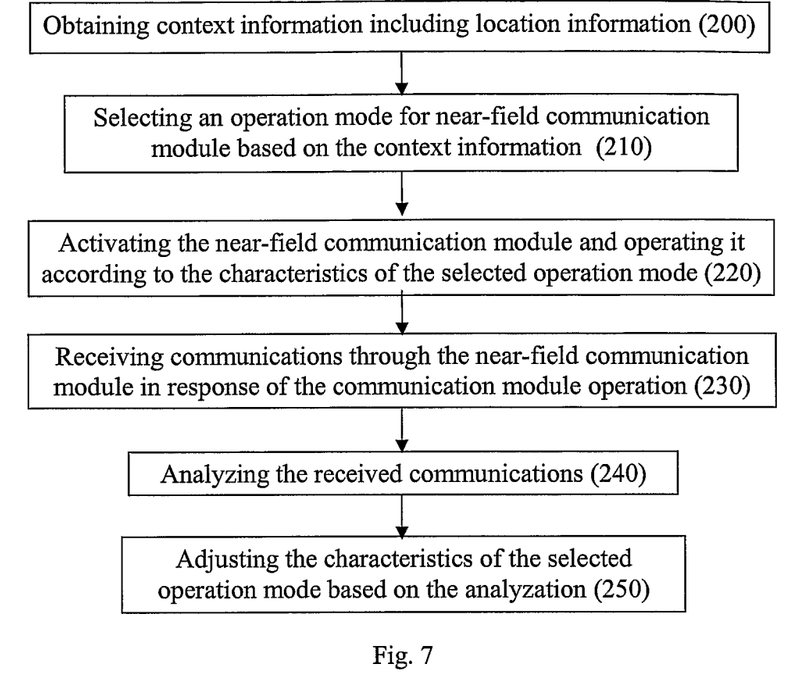
FIG. 7 is a flow diagram of an embodiment of the method of the present invention.

FIG. 7 is a flow diagram of an embodiment of the method of the present invention. The method starts with obtaining context information including location information (200), and proceeds with selecting an operation mode for near-field communication module based on the context information (210). Then the near-field communication module is activated and operated according to the characteristics of the selected operation mode (220). During operation of the near-field communication module, communications are received through the near-field communication module in response of the operation of the communication module (230). The received communications are analyzed (240), and on the basis of this analysis the characteristics of the selected operation mode may be adjusted (250) to better suite with the environmental characteristics.

Figure 8:
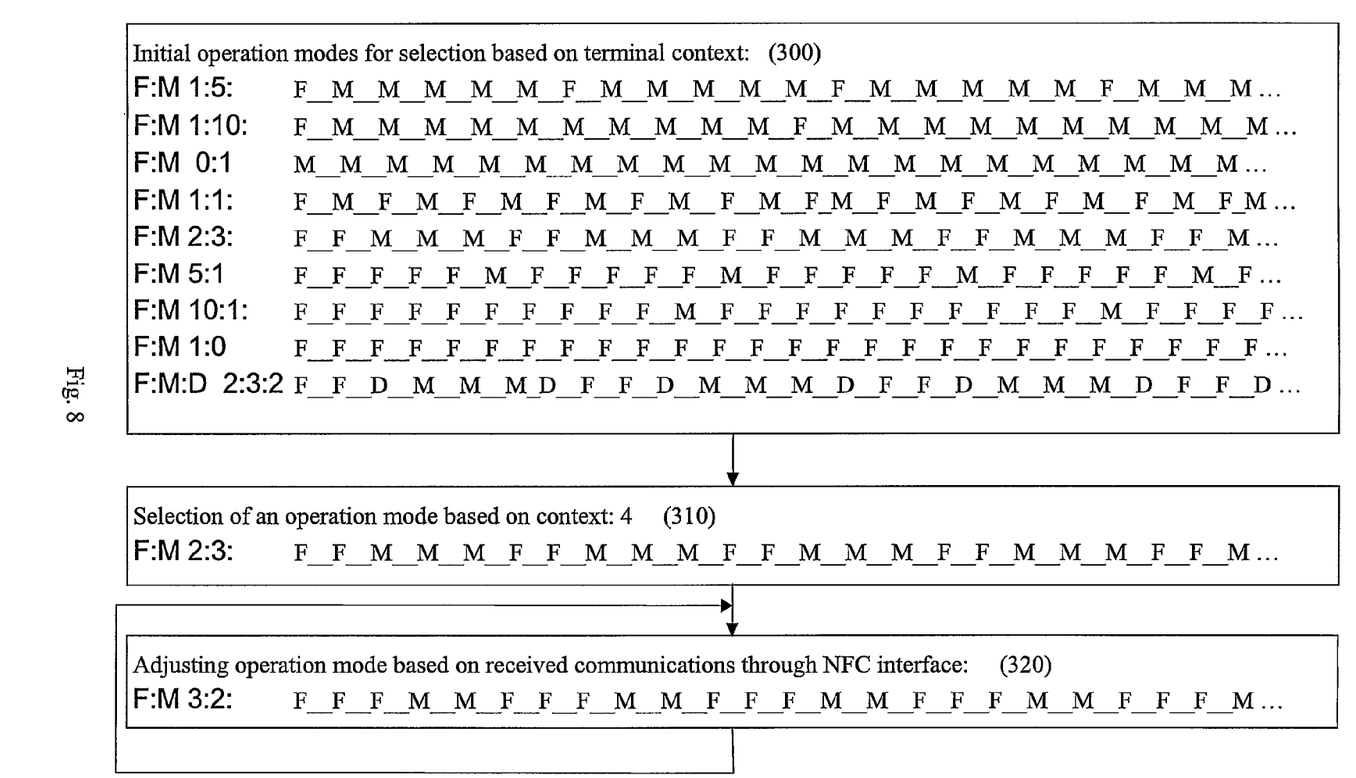
FIG. 8 is another flow diagram illustrating an embodiment of the method of the present invention and examples for the use of proportionality values for communicating according to said two or more supported data formats.

FIG. 8 is another flow diagram illustrating an embodiment of the method of the present invention and examples for the use of proportionality values for communicating according to said two or more supported data formats.

The general idea, according to various embodiments of the present invention, is to switch the operation of the near-field communication module between the supported near-field communication protocols based on at least following criteria:
1) the context of terminal including at least the location information, and
2) received responses from detected RFID devices within the coverage of the RFID reader.

So, according to embodiments of the present invention, it is possible to implement an algorithm in the multifunctional near-field communication device to control the operation of the near-field communication module for switching between various supported near-field communication protocols using the above information.

FIG. 8 depicts in the first box 300 a number of nine initial operation modes for primary selection for the near-field communication device. For the sake of clarity only two near-field communication data formats/protocols/standards are shown. The modes are named F according to FeliCa and M according to Mifare. The initial operation modes comprise a proportional value of 1:5, 1:10, 0:1, 1:1 2:3, 3:2, 5:1, 10:1, 1:0 F to M. It should be noted that the expression X:Y is considered as a proportion and not as a division (to avoid divisions by zero). An additional initial operation mode is depicted as 2:3:2 F:M:D, wherein D stands for delay period. This initial operation mode may be used for saving additional energy at the near-field communication module during the delay periods. It is not necessary to exactly define the length of each delay, as it may be dependent on additional parameters such as tuning periods and the like. However the delay period D should at least be as long as a Mifare or FeliCa communication set up or e.g. a service discovery procedure.

According to an embodiment of the present invention in a first step the operation mode F:M 2:3 is selected 310 according to received context data or context information. In the example the terminal sends interrogation signal for every 50$^{th}$ milliseconds and based on the location information, the terminal selects F:M 2:3-mode having rules that the operation includes two FeliCa scans for three Mifare scans, so the scanning operation is following:
F_F_M_M_M_F_F_M_M_M_F_F_M_M_M_F_F_M_M_M_F_ . . .

After a certain time while the near-field communication module operates according to the operation mode F:M 2:3 it is detected at the NFC/RFID module that the detected communications indicate that the use of an operation mode F:M 3:2 could better fit the actual environment, and therefore a corresponding mode changing command is provided by device controller to adapt the operation of the near-field communication module according to the environmental characteristics, so the scanning operation is following:
F_F_F_M_M_F_F_F_M_M_F_F_F_M_M_F_F_F_M_M_F_F_F_M_ . . .

After an additional while, the environmental characteristics are further evaluated and according to the embodiment presented on FIG. 8, a decision is made to maintain the operation mode F:M 3:2.

According to alternative imaginable embodiments, the device may have detected some Mifare tags/devices and no more FeliCa tags/devices, so the operation may change to F:M 1:15, as follows:
F_M_M_M_M_M_M_M_M_M_M_M_M_M_M_M_F_M_M_M_M_M_M_M_ . . .

This adjustment of the operation may be continue all the time the near-field communication module is active, and this information can be used according to an embodiment of the present invention, to create history information regarding to a particular location that can be used later on to select a best-matching operation mode for the location.

All the advantages of the present invention such as saving of battery power due to reduced scanning and the possibility of faster response as no unnecessary scanning is performed an be achieved by the expense of providing a database must be maintained and which requires processor and memory capacity.

Another advantage is that may be achieved by the implementations of the invention is that very good relations between power consumption vs. responsiveness can be achieved. The invention can be used automatic and precise control without any need for user interaction. The invention can also be implemented as a self-maintaining system. These advantages may be achieved by an extension of a respective infrastructure of a wireless communication network.

This application contains the description of implementations and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method comprising:
receiving context information about the context of a multifunctional near-field communication device configured to support two or more near-field communication data formats according to respective protocols,
causing selection of an operation mode for the multifunctional near-field communication device for communicating with external near-field communication devices on the basis of said received context information, wherein said selected operation mode defines proportionality values for communicating according to said two or more supported data formats according to respective protocols of respective standards for switching operation of said multifunctional near-field communication device between said two or more supported data formats according to respective protocols based on the proportionality values, receiving updated context information based at least in part on data associated with at least one external near-field communication device, and causing adjustment of the operation mode of the multifunction near-field communication device for communicating with the external near-field communication devices on the basis of the received updated context information.

2. The method according to claim 1, wherein said updated context information is obtained with a subsequent process.

3. The method according to claim 1, wherein said context information is obtained on the basis of the frequency of detected devices using a particular one of the supported communication protocols.

4. The method according to claim 1, wherein said context information is obtained during an adaptation period, during which all notified target types are logged.

5. The method according to claim 1, wherein said context information is obtained on the basis of location information.

6. The method according to claim 1, wherein said context information is obtained on the basis of history information.

7. The method according to claim 1, wherein said receiving context information comprises receiving initial context information from a wireless communication network.

8. The method according to claim 7, wherein said receiving of context information from a wireless communication network comprises:
establishing a connection to said wireless communication network, and
receiving said requested context information.

9. The method according to claim 8, further comprising sending a request for context information to said communication network.

10. The method according to claim 1, further comprising:
sending received context information to a wireless communication network.

11. The method for operating a multifunctional near-field communication device according to claim 3, wherein context information is obtained by a combination of a least two different methods for receiving said context information.

12. A method comprising:
detecting a multifunctional near-field communication device connected to a communication network,
causing sending of context information to said multifunctional near-field communication device based on at least a determined location of said multifunctional near-field communication device,
receiving a request for updated context information from the multifunctional near-field communication device, and
causing sending of updated context information, wherein the updated context information is based at least in part on data associated with at least one external near-field communication device.

13. The method according to claim 7 further comprising providing context information to the multifunctional near-field communication device connected to a wireless communication network, wherein providing context information comprises (i) detecting a multifunctional near-field communication device connected to said communication network, and (ii) sending context information to said multifunctional near-field communication device based on at least a determined location of said multifunctional near-field communication device.

14. A method comprising:
receiving location data about the location of a multifunctional near-field communication device configured to support two or more near-field communication date formats according to respective protocols,
causing selection of an operation mode for the multifunctional near-field communication device for communicating with external near-field communication devices on the basis of said obtained location data,
receiving updated context information based at least in part on data associated with at least one external near-field communication device, and
causing adjustment of the operation mode of the multifunction near-field communication device for communicating with the external near-field communication devices on the basis of the received updated context information.

15. The method according to claim 14, wherein said selected operation mode defines proportionality values for communicating according to said two or more supported data formats according to respective protocols of respective standards for switching operation of said multifunctional near-field communication device between said two or more supported data formats according to respective protocols based on the proportionality values.

16. The method according to claim 14 further comprising:
detecting the frequency used by devices with a particular one of the supported communication protocols, and
adjusting said operation mode of the multifunctional near-field communication device for communicating with external devices on the basis of said detected frequency.

17. The method according to claim 14, wherein the received location information and selected operation mode are logged.

18. Computer program product comprising a non-transitory computer readable medium having program code portions stored thereon, the program code portions being configured when run on a computer or network device to carry out the method of claim 1.

19. Computer program product comprising a non-transitory computer readable medium having program code portions stored thereon, the program code portions being configured when run on a computer or network device to carry out the method of claim 14.

20. An apparatus comprising
a processor and a memory including computer program code, the memory and the computer program code configured to, with the processor, cause the apparatus to:
receive context information about the context of a multifunctional near-field communication device configured to support two or more near-field communication data formats according to respective protocols,
cause selection of an operation mode for the multifunctional near-field communication device for communication with external near-field communication devices on the basis of said received context information, wherein said selected operation mode defines proportionality values for communicating according to said two or more supported data formats according to respective protocols of respective standards for switching operation of the multifunctional near-field communication device between said two or more supported data formats according to respective protocols based on the proportionality values,
receive updated context information based at least in part on data associated with at least one external near-field communication device, and cause adjustment of the operation mode of the multifunction near-field communication device for communicating with the external near-field communication devices on the basis of the received updated context information.

21. The apparatus according to claim 20, wherein the context information is obtained with a subsequent process.

22. The apparatus according to claim 20, wherein said received context information is based on initial context information received from a wireless communication network.

23. The apparatus according to claim 20, wherein the memory and the computer program code are further configured to, with the processor, cause the apparatus to store history information.

24. The apparatus according to claim 20, wherein the context information is obtained on the basis of location information.

25. The apparatus according to claim 20, wherein the context information is obtained on the basis of frequency of detected devices using a particular one of the supported communication protocols.

26. The apparatus according to claim 20, wherein the memory and the computer program code are further configured to, with the processor, cause the apparatus to establish a connection to a wireless communication network.

27. The apparatus according to claim 24, wherein the context information is obtained from a GPS navigation module.

28. The apparatus according to claim 20, wherein the memory and the computer program code are further configured to, with the processor, cause the apparatus to pay for certain services.

29. An apparatus comprising
a processor and a memory including computer program code, the memory and the computer program code configured to, with the processor, cause the apparatus to:
receive location data about the location of a multifunctional near-field communication device configured to support two or more near-field communication date formats according to respective protocols,
cause selection of an operation mode for the multifunctional near-field communication device for communicating with external near-field communication devices on the basis of said obtained location data,
receive updated context information based at least in part on data associated with at least one external near-field communication device, and
cause adjustment of the operation mode of the multifunction near-field communication device for communicating with the external near-field communication devices on the basis of the received updated context information.

30. The apparatus according to claim 29, wherein said selected operation mode defines proportionality values for communicating according to said two or more supported data formats according to respective protocols of respective standards for switching operation of the multifunctional near-field communication device between said two or more supported data formats according to respective protocols based on the proportionality values.

31. The apparatus according to claim 29, wherein the memory and the computer program code are further configured to, with the processor, cause the apparatus to
detect the frequency used by devices with a particular one of the supported communication protocols, and adjust said operation mode of the multifunctional near-field communication device for communicating with external devices on the basis of detected frequencies.

32. The apparatus according to claim 29, wherein the context information is obtained with a subsequent process.

33. An apparatus comprising:
means for receiving context information about the context of a multifunctional near-field communication device configured to support two or more near-field communication data formats according to respective protocols,
means for causing selection of an operation mode for the multifunctional near-field communication device for communicating with external near-field communication devices on the basis of said received context information, wherein said selected operation mode defines proportionality values for communicating according to said two or more supported data formats according to respective protocols of respective standards for switching operation of said device between said two or more supported data formats according to respective protocols based on the proportionality values,
means for receiving updated context information based at least in part on data associated with at least one external near-field communication device, and
means for causing adjustment of the operation mode of the multifunction near-field communication device for communicating with the external near-field communication devices on the basis of the received updated context information.

34. An apparatus comprising:
means for receiving location data about the location of a multifunctional near-field communication device configured to support two or more near-field communication data formats according to respective protocols,
means for causing selection of an operation mode for the device for communicating with external near-field communication devices on the basis of said received location data,
means for receiving updated context information based at least in part on data associated with at least one external near-field communication device, and
means for causing adjustment of the operation mode of the multifunction near-field communication device for communicating with the external near-field communication devices on the basis of the received updated context information.

35. An apparatus comprising a processor and a memory including computer program code, the memory and the computer program code configured to, with the processor, cause the apparatus to:
detect a multifunctional near-field communication device connected to a communication network,
cause sending of context information to said multifunctional near-field communication device based on at least a determined location of said multifunctional near-field communication device,
receive a request for updated context information from the multifunctional near-field communication device, and
cause sending of updated context information, wherein the updated context information is based at least in part on data associated with at least one external near-field communication device.

36. An apparatus comprising:
means for detecting a multifunctional near-field communication device connected to a communication network,
means for causing sending of context information to said multifunctional near-field communication device based on at least a determined location of said multifunctional near-field communication device,
means for receiving a request for updated context information from the multifunctional near-field communication device, and means for causing sending of updated context information, wherein the updated context information is based at least in part on data associated with at least one external near-field communication device.

37. Computer program product comprising a non-transitory computer readable medium having program code portions stored thereon, the program code portions being configured when run on a computer or network device to carry out the method of claim 12.

* * * * *